(12) United States Patent
Raichelgauz et al.

(10) Patent No.: US 11,132,548 B2
(45) Date of Patent: Sep. 28, 2021

(54) DETERMINING OBJECT INFORMATION THAT DOES NOT EXPLICITLY APPEAR IN A MEDIA UNIT SIGNATURE

(71) Applicant: CORTICA LTD., Tel Aviv (IL)

(72) Inventors: Igal Raichelgauz, Tel Aviv (IL); Kirill Dyagilev, Jersey, NJ (US)

(73) Assignee: Cortica Ltd., Tel Aviv (IL)

( * ) Notice: Subject to any disclaimer, the term of this patent is extended or adjusted under 35 U.S.C. 154(b) by 0 days.

(21) Appl. No.: 16/808,405

(22) Filed: Mar. 4, 2020

(65) Prior Publication Data

US 2020/0302174 A1 Sep. 24, 2020

Related U.S. Application Data

(60) Provisional application No. 62/821,144, filed on Mar. 20, 2019.

(51) Int. Cl.
*G06K 9/00* (2006.01)
*G06K 9/62* (2006.01)
(Continued)

(52) U.S. Cl.
CPC ....... *G06K 9/00671* (2013.01); *G06K 9/6251* (2013.01); *G06N 3/0445* (2013.01); *G06N 3/0454* (2013.01); *G06N 3/08* (2013.01)

(58) Field of Classification Search
CPC ............ G06K 9/00671; G06K 9/6251; G06N 3/0445; G06N 3/0454; G06N 3/08
See application file for complete search history.

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| EP | 1085464 A3 | 1/2007 |
| WO | 0231764 A2 | 4/2002 |

(Continued)

OTHER PUBLICATIONS

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

(Continued)

*Primary Examiner* — Md N Haque
(74) *Attorney, Agent, or Firm* — Reches Patent

(57) ABSTRACT

There may be provided a method for determining object information related to an object that appears in a media element, the method may include (a) receiving or generating a signature of the media element, wherein the signature may include identifiers, wherein the identifiers may include an object identifier related to the object, wherein the object identifier points to locations of output elements, within an output of a convolutional neural network, of elements of significance in relation to the object; (b) finding a group of contributing portions of the media element that had a significant contribution to the generation, by the convolutional neural network, of the output elements of significance in relation to the object; and (c) determining object information related to the object based on a distribution of the group of the contributing portions of the media element.

24 Claims, 8 Drawing Sheets

(51) Int. Cl.
  *G06N 3/04* (2006.01)
  *G06N 3/08* (2006.01)

(56) References Cited

U.S. PATENT DOCUMENTS

| | | |
|---|---|---|
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |

(56) References Cited

U.S. PATENT DOCUMENTS

| | | |
|---|---|---|
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0027983 A1* | 1/2008 | Erol ................. G07F 7/127 |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |

(56) References Cited

U.S. PATENT DOCUMENTS

| | | |
|---|---|---|
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara et al. |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1* | 7/2018 | Wolf ................ G06K 9/6202 |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

(56) References Cited

FOREIGN PATENT DOCUMENTS

OTHER PUBLICATIONS

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "Clue: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: 8 May 2018). (Year: 2018).
Chen, Tiffany Yu-Han, et al. "Glimpse: Continuous, real-time object recognition on mobile devices." Proceedings of the 13th Acm Confrecene on Embedded Networked Sensor Systems. 2015. (Year: 2015).
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma et el "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.

(56) References Cited

OTHER PUBLICATIONS

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al ("Hibrid-Soc: A Multi-Core SOC Architecture for Multimedia Signal Processing" 2003).

Stolberg et al, "Hibrid-SOC: A Mul ti-Core SOC Architecture for Mul timedia Signal Processing", 2003 IEEE, pp. 189-194.

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Vallet et al ("Personalized Content Retrieval in Context Using Ontological Knowledge" Mar. 2007) (Year: 2007).

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University Advent Technical Report # 222-2006-8, Mar. 20, 2007, pp. 1-17.

Yanagawa et al., "Columbia University's Baseline Detectors for 374 LSCOM Semantic Visual Concepts", Columbia University Advent Technical Report #222, 2007, pp. 2006-2008.

\* cited by examiner

DETERMINING OBJECT INFORMATION THAT DOES NOT EXPLICITLY APPEAR IN A MEDIA UNIT SIGNATURE

CROSS REFERENCE

This application claims priority from U.S. provisional patent Ser. No. 62/821,144, filing date Mar. 20, 2019.

BACKGROUND

In object detection there is a tension between the task of object classification ("is it a pedestrian?") and localization ("where is the pedestrian? what is its size/scale?").

While classification task benefits from scale-invariant representations (pedestrians of all sizes have the same representation therefore it is easy to identify them), the localization task needs to preserve the scale of objects in the image There is a growing need to provide efficient manners to provide object detection solutions that may solve this tension.

SUMMARY

A method for determining object information related to an object that appears in a media element, the method may include receiving or generating a signature of the media element, wherein the signature may include identifiers, wherein the identifiers may include an object identifier related to the object, wherein the object identifier points to locations of output elements, within an output of a convolutional neural network, of elements of significance in relation to the object; finding a group of contributing portions of the media element that had a significant contribution to the generation, by the convolutional neural network, of the output elements of significance in relation to the object; and determining object information related to the object based on a distribution of the group of the contributing portions of the media element.

The signature may include a group of contributing portions of the media element that had a significant contribution to the generation, by the convolutional neural network, of the output elements of significance in relation to the object.

The method may include generating the signature in an iterative manner, wherein each iteration may include maintaining a mapping between (a) elements of an output of the iteration, and (b) contributing portions of the media element that had a significant contribution to a generation of the elements of the output of the iteration.

The method may include maintaining mapping related only to output elements of significance of an output of the convolutional neural network.

The object information may be scale information.

The object information may be orientation information.

The finding of the group of contributing portions of the media element may include multiple search iterations; wherein each search iteration may be applied on significance contributing output elements of a current layer of the convolutional neural network; wherein each search iteration may include searching, for each one of the significance contributing output elements of the current layer for a group of significant contribution output elements of a previous layer of the convolutional neural network.

Each search iteration may include applying, at each layer of the convolutional neural network, a search function that inverses an operation of the layer of the convolutional neural network.

The operation of the current layer of the convolutional neural network may be a maxpool operation for selecting a local maximum out of a subgrid of output elements of the previous layer; and wherein the search function searches for the output element of the previous layer that had a value of the subgrid.

The operation of the current layer of the convolutional neural network may be applying a convolution kernel on a subgrid of output elements of the previous layer; and wherein the search function searches a product out of a multiplication of each output element of the sub-grid by a weight of the convolution kernel.

The media unit may be an image.

The output of the convolutional neural network may be a tensor that may include a vector of values per each segment of the image; wherein the object appears in a certain segment and wherein the object identifier points to locations of significant values, within a certain vector associated with the certain segment; and wherein the portions of the media element may be image pixels.

There may be provided a non-transitory computer readable medium for determining object information related to an object that appears in a media element, the non-transitory computer readable medium may store instructions receiving or generating a signature of the media element, wherein the signature may include identifiers, wherein the identifiers may include an object identifier related to the object, wherein the object identifier points to locations of output elements, within an output of a convolutional neural network, of elements of significance in relation to the object; finding a group of contributing portions of the media element that had a significant contribution to the generation, by the convolutional neural network, of the output elements of significance in relation to the object; and determining object information related to the object based on a distribution of the group of the contributing portions of the media element.

The signature may include a group of contributing portions of the media element that had a significant contribution to the generation, by the convolutional neural network, of the output elements of significance in relation to the object.

There may be provided a non-transitory computer readable medium that may store instructions for generating the signature in an iterative manner, wherein each iteration may include maintaining a mapping between (a) elements of an output of the iteration, and (b) contributing portions of the media element that had a significant contribution to a generation of the elements of the output of the iteration.

The non-transitory computer readable medium that may store instructions for maintaining mapping related only to output elements of significance of an output of the convolutional neural network.

The object information may be scale information.

The object information may be orientation information.

The finding of the group of contributing portions of the media element may include multiple search iterations; wherein each search iteration may be applied on significance contributing output elements of a current layer of the convolutional neural network; wherein each search iteration may include searching, for each one of the significance contributing output elements of the current layer for a group of significant contribution output elements of a previous layer of the convolutional neural network.

Each search iteration may include applying, at each layer of the convolutional neural network, a search function that inverses an operation of the layer of the convolutional neural network.

The operation of the current layer of the convolutional neural network may be a maxpool operation for selecting a local maximum out of a subgrid of output elements of the previous layer; and wherein the search function searches for the output element of the previous layer that had a value of the subgrid.

The operation of the current layer of the convolutional neural network may be applying a convolution kernel on a subgrid of output elements of the previous layer; and wherein the search function searches a product out of a multiplication of each output element of the sub-grid by a weight of the convolution kernel.

The media unit may be an image.

The output of the convolutional neural network may be a tensor that may include a vector of values per each segment of the image; wherein the object appears in a certain segment and wherein the object identifier points to locations of significant values, within a certain vector associated with the certain segment; and wherein the portions of the media element may be image pixels.

There may be provided a processing circuit for executing at least one of the methods disclosed in the specification and/or the claims and/or the drawings. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The processing circuit may be configured to determining object information related to an object that appears in a media element, by (a) receiving or generating a signature of the media element, wherein the signature may include identifiers, wherein the identifiers may include an object identifier related to the object, wherein the object identifier points to locations of output elements, within an output of a convolutional neural network, of elements of significance in relation to the object; (b) finding a group of contributing portions of the media element that had a significant contribution to the generation, by the convolutional neural network, of the output elements of significance in relation to the object; and (c) determining object information related to the object based on a distribution of the group of the contributing portions of the media element.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
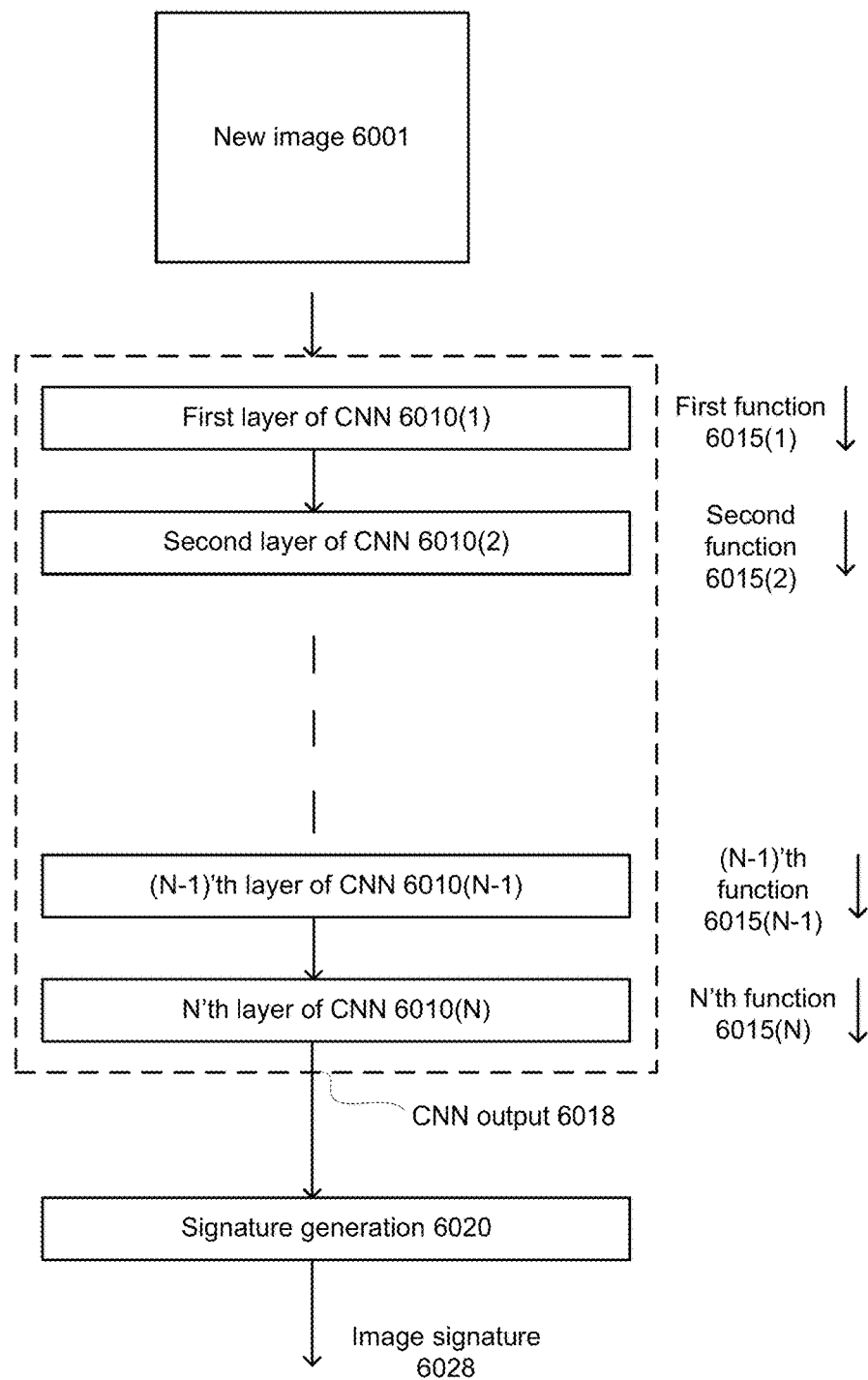
FIG. 1 illustrates an example of a generation of a signature of an image by a convolutional neural network (CNN)

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, non-transitory computer readable medium and method for extracting object information such as a scale information, orientation information or other information from a signature of an image that does not explicitly include that image information.

Thus—the signature itself may be compact and robust to changes in scale, to changes in orientation or to other changes—but the scale information or orientation information may be extracted.

Using such a signature increases the accuracy of object detection, required less storage and processing resources. For example—less signatures may be stored (as there is no need in a signature per scale, per orientation, and the like), in order to match signatures fewer processing resources should be allocated.

The object information may be at least one out of (a) any statistics (for example—aggregated statistics) regarding the contributing portions of the media element (the statistics may be applied on a pixel basis or on a coarser basis), (b) precise location of the contributing portions, for example— in a case of an image size of a contributing area aka "scale" and the orientation of the area, (c) in case of an image-predominant color of the pixels in the contributing portion, (d) apply additional filters/layers only to specified contributing portions. For example—the method may find a particular identifier, find a contributing portion associated with the identifier and then apply a smaller auxiliary network only to this contributing portion. This will be much more computationally efficient than applying this auxiliary network to the whole media unit.

In the following text it is assumed that the media unit is an image—although the media unit may be an audio unit, a multimedia unit, any representation of a measurement of a natural signals, any other measurements, and the like.

The following text may refer to a significant value or to a significant contribution. The significant value may be the most significant value and the significant contribution may be the highest contribution. A significant value is a value that fulfills a significant criterion. The significant value may be a value that exceeds a threshold, a value that is within a predefined value range, belong to a group of highest values, have a highest absolute value, be below a certain threshold, be of a smallest value, belong to a group of lowest values, and the like. The significance criterion may be determined by the function applied by one or more layers of the CNN, may be determined based on a response of one or more layers of the CNN to objects that were marked or determined as significant, and the like.

FIG. 1 illustrates an example of a signature generation process.

An image 6001 is fed to a convolutional network layer (CNN) 6010 that has multiple (N) layers 6010(1)-6010(N), N being a positive integer that may exceed three.

Each layer applies a function and the CNN applies N functions 6015(1)-6015(N). The output of the N'th layer 6010(N) is denoted CNN output 6018. The CNN output is further processed (by step 6020 of a completion of signature generation) to provide an image signature 6028.

CNN output 6018 may include multiple values per each segment of the media unit. The values may represent attributes, properties, and the like.

Step 6020 of completion of signature generation may include selecting, out of values of the CNN output the significant values per media unit segment.

Figure 2:
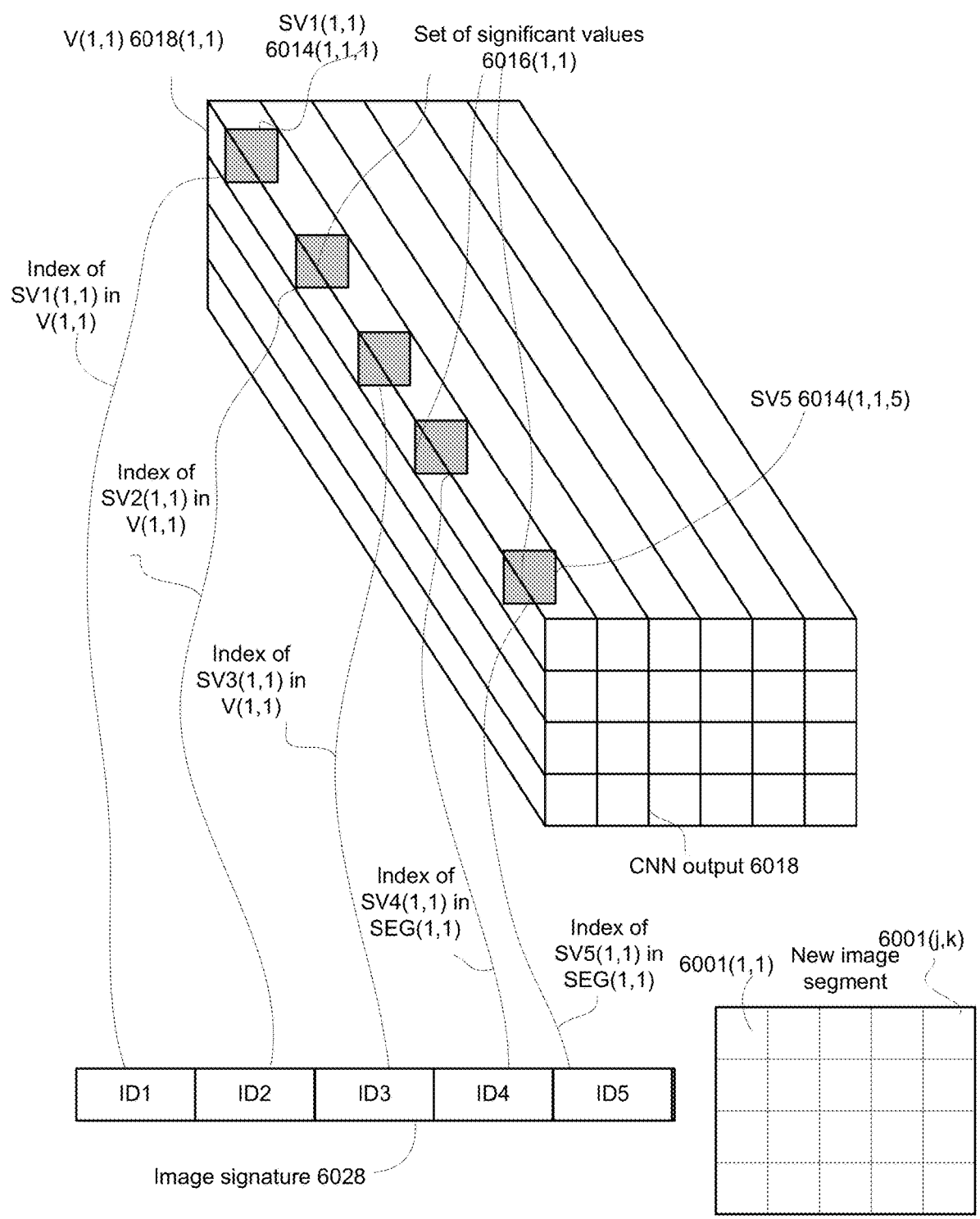
FIG. 2 illustrates an example of segments of the image, an output of the CNN and the signature of the image.

FIG. 2 illustrates an example of CNN output 6018 and of image signature 6028.

The image 6001 is virtually segments to segments 6000 (i,k). The segments may be of the same shape and size but this is not necessarily so. One or more segments may at least partially overlap and/or one or more segments may not overlap.

CNN output 6018 is a tensor that includes a vector of values per each segment of the media unit. An object appears in a certain segment. An object identifier (of the signature) points to locations of significant values, within a certain vector associated with the certain segment.

For example—a top left segment (6001(1,1)) of the image may be represented in the CNN output 6018 by a vector V(1,1) 6018(1,1) that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may be selected in any other manner.

FIG. 2 illustrates a set of significant responses 6016(1,1) of vector V(1,1) 6018(1,1). The set includes five significant values (such as first significant value SV1(1,1) 6014(1,1,1), second significant value SV2(1,1), third significant value SV3(1,1), fourth significant value SV4(1,1), and fifth significant value SV5(1,1) 6014(1,1,5).

The image signature 6028 includes five indexes for the retrieval of the five significant values—first till fifth identifiers ID1-ID5 are indexes for retrieving the first till fifth significant values.

Figure 3:
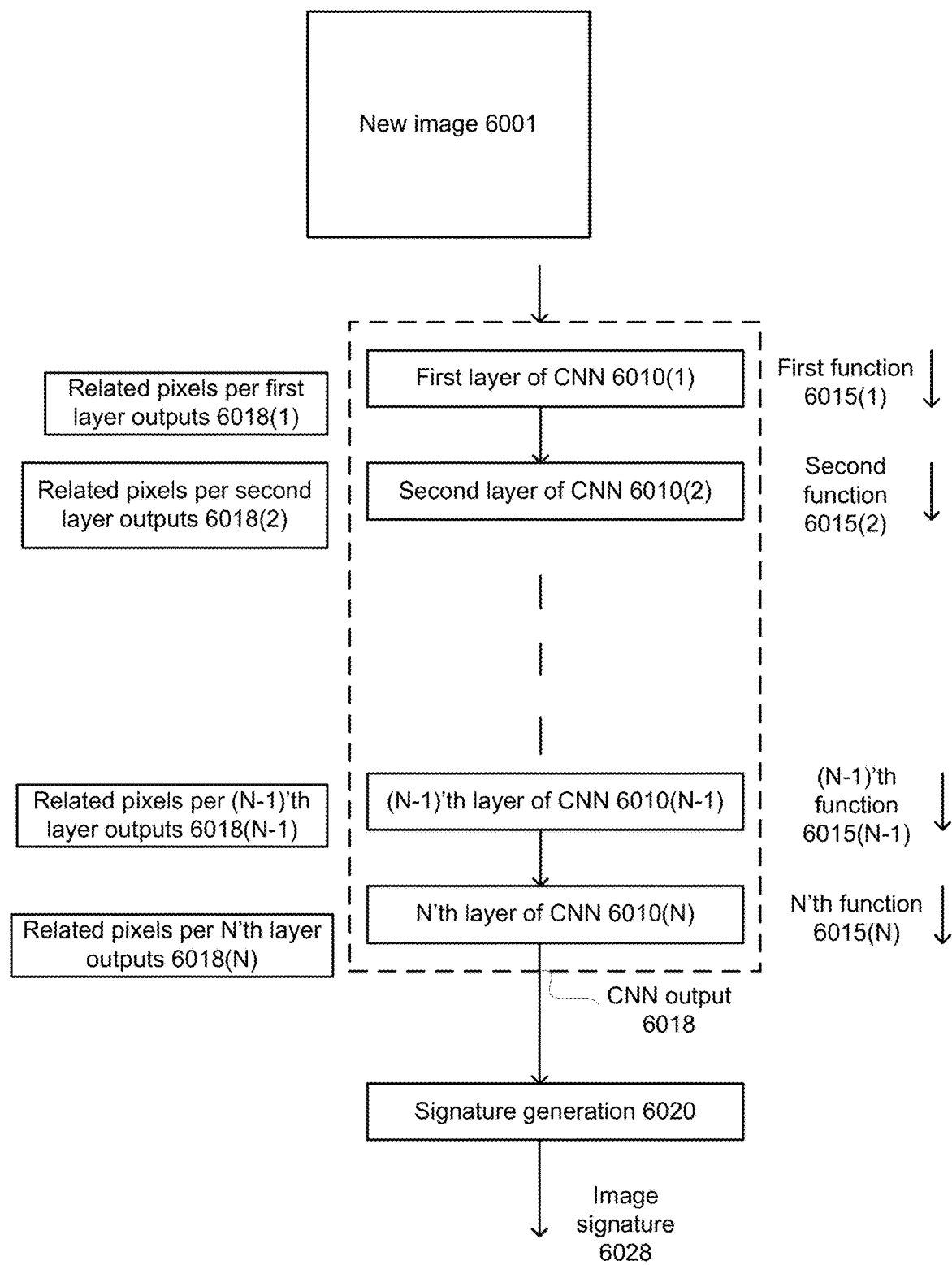
FIG. 3 illustrates a process for obtaining object information from the signature of the image.

FIG. 3 illustrates an example of a signature generation process that include maintaining information that links pixels of the image 6001 to the output of each one of the layers of the CNN, and links pixels of the image to the values of the CNN output that are identified by indexes of the signature.

Once the values of the CNN output are selected and the selected values are identified by identifiers in the signature—information related to pixels that are related to non-elected values may be deleted—to save storage space.

Thus—the outcome of the N layers of the CNN network (6010(1)-6010(N)) also includes the pixels that are linked to the output of each of the layer —6018(1)-6018(N).

Figure 4:
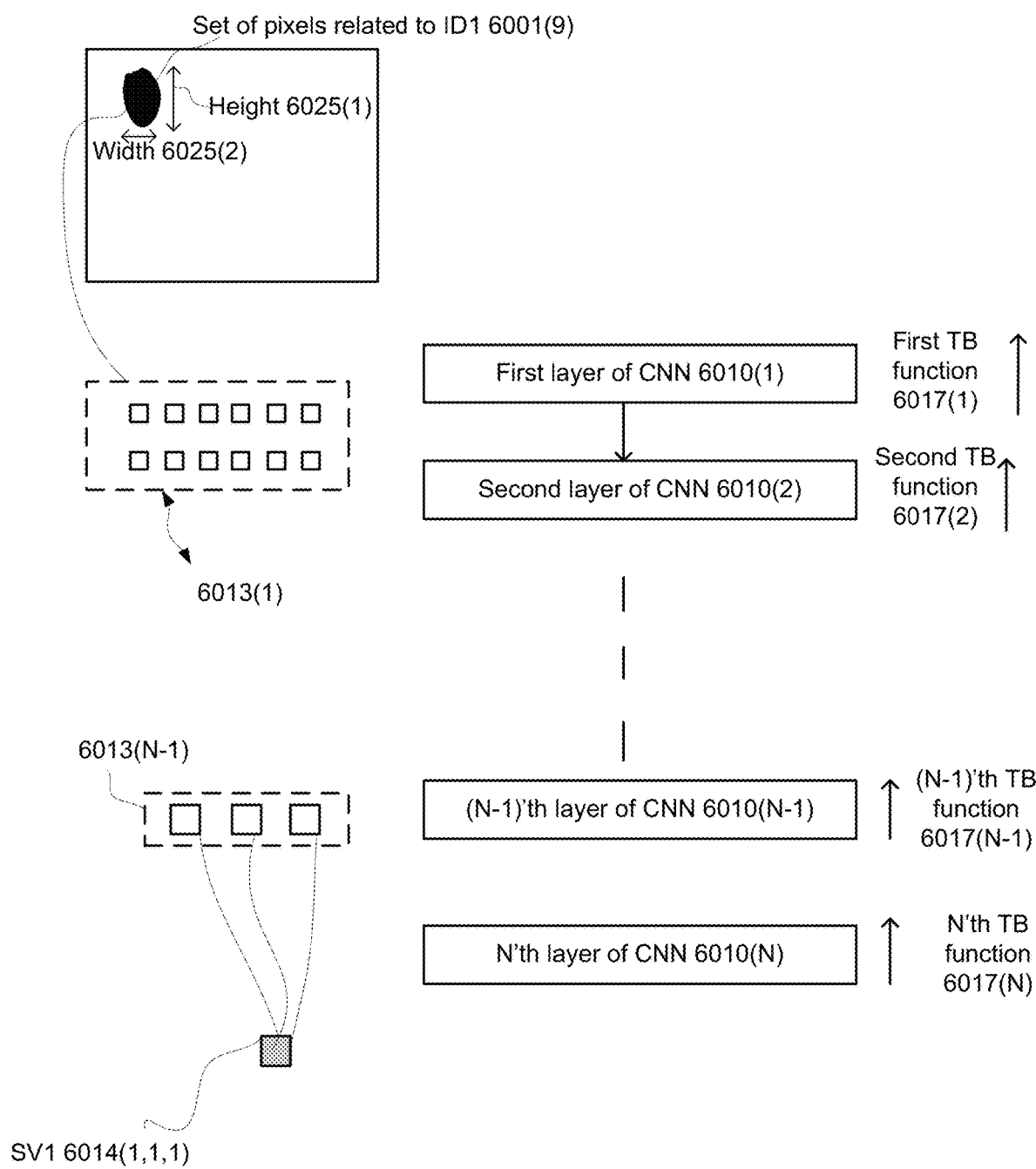
FIG. 4 illustrates a process for obtaining object information from the signature of the image.

FIG. 4 illustrates a process for obtaining object information from the signature of the image.

The process includes tracing back, for each layer (of the second till N'th layer) of the CNN the outputs of a previous layer that contributed to the significant values of the current layer. For the first layer—tracing back the pixels that contributed to the significant values of the output of the first CNN layer.

Thus N traceback (TB) functions are applied—from first TB function till N'th TB function 6017(1)-6017(N).

Thus, for a first identifier ID1 in the signature—(identifier first significant value SV1 6014(1,1)), the N'th TB function 6017(N) finds the set of contributing (N−1)'th layer outputs 6013(N−1). The first TB function 6017(1) finds the pixels (set of pixels) related to ID1 6001(9)—by searching pixels that contributed to significant first layer output values 6013 (1).

Figure 5:
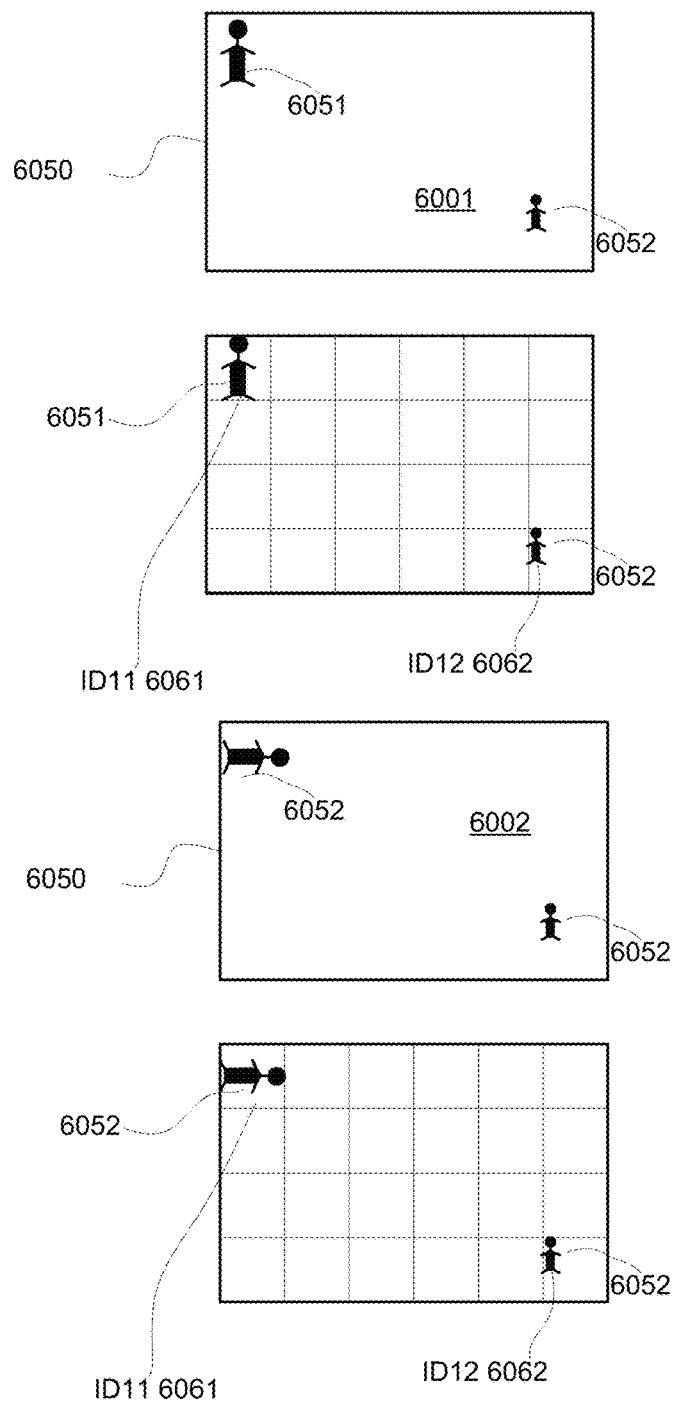
FIG. 5 is an example of a method.

FIG. 5 illustrates an example of a first image 6001 that includes a standing first person 6051 of a first scale and a standing person 6052 of a second scale that differs from the first scale.

FIG. 5 also illustrates an example of a second image 6002 that includes a laying first person 6051 of a first scale and a standing person 6052 of a second scale that differs from the first scale.

The first and second images are segmented to segments and each segment may be represented by a vector, out of which significant values will be selected and identified by identifiers (indexes) that belong to the first image signature and the second image signature respectively.

The first person 6051 will be identified by first index ID11 6061 in the signatures of the first and second images and the second person 6052 will be identified by second index ID12 6062 in the signatures of the first and second images. These signature do not include (explicitly) the scale and orientation of the first and second persons—but the methods disclosed in the application extract the scale and orientation information.

Figure 6:
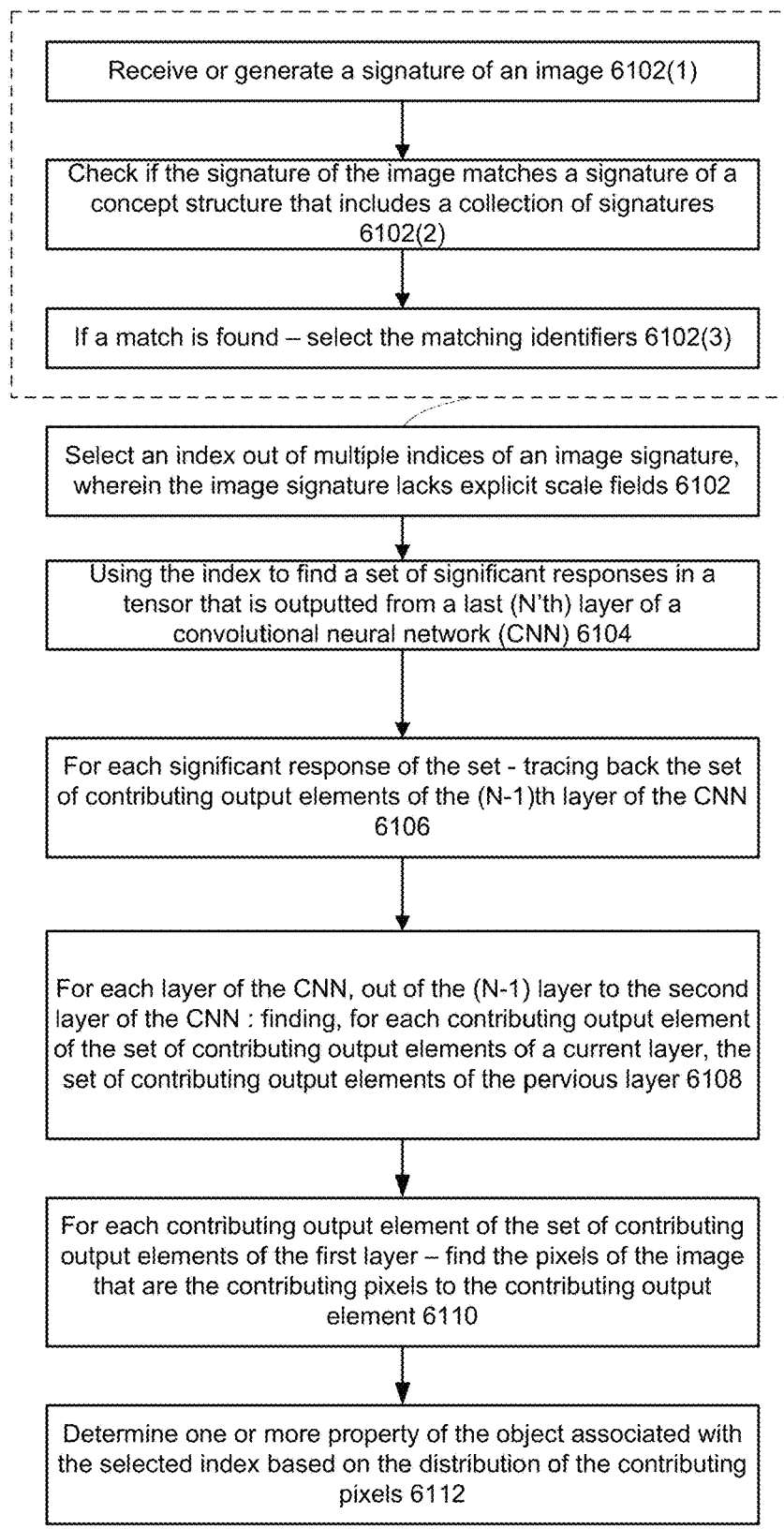
FIG. 6 illustrates an example of an image with two objects of different scale.

FIG. 6 illustrates an example of a method 6100.

Method 6100 includes a sequence of steps 6102, 6104, 6106, 6108, 6110, and 6112.

Step 6102 may include selecting an index out of multiple indices of an image signature, wherein the image signature lacks explicit scale fields.

The selection can be made according to various criteria. For example—the selection may follow a match between a concept structure and a signature of an image. The concept structure may include signatures and metadata related to the signatures. A concept may represent an object.

Step 6102 may include steps 6102(1), 6102(2) and 6102(3).

Step 6102(1) may include receiving or generating a signature of an image 6102(1).

Step 6102(2) may include checking if the signature of the image matches a signature of a concept structure that includes a collection of signatures. A match occurs if at least a predefined number of identifies in the signature of the image match identifiers of a signature of the concept structure.

If a matching occurs—selecting (6102(3)) the matching signatures to undergo steps 6104-6112.

Step 6104 may include using the index to find a set of significant responses in a tensor that is outputted from a last (N'th) layer of a convolutional neural network (CNN).

Step 6106 may include, for each significant response of the set—tracing back the set of contributing output elements of the (N−1)th layer of the CNN.

Step 6108 may include performing, for each layer of the CNN, out of the (N−1) layer to the second layer of the CNN, finding, for each contributing output element of the set of contributing output elements of a current layer, the set of contributing output elements of the pervious layer.

Step 6110 may include finding, for each contributing output element of the set of contributing output elements of the first layer, the pixels of the image that are the contributing pixels to the contributing output element.

Step 6112 may include determining one or more property of the object associated with the selected index based on the distribution of the contributing pixels.

Figure 7:
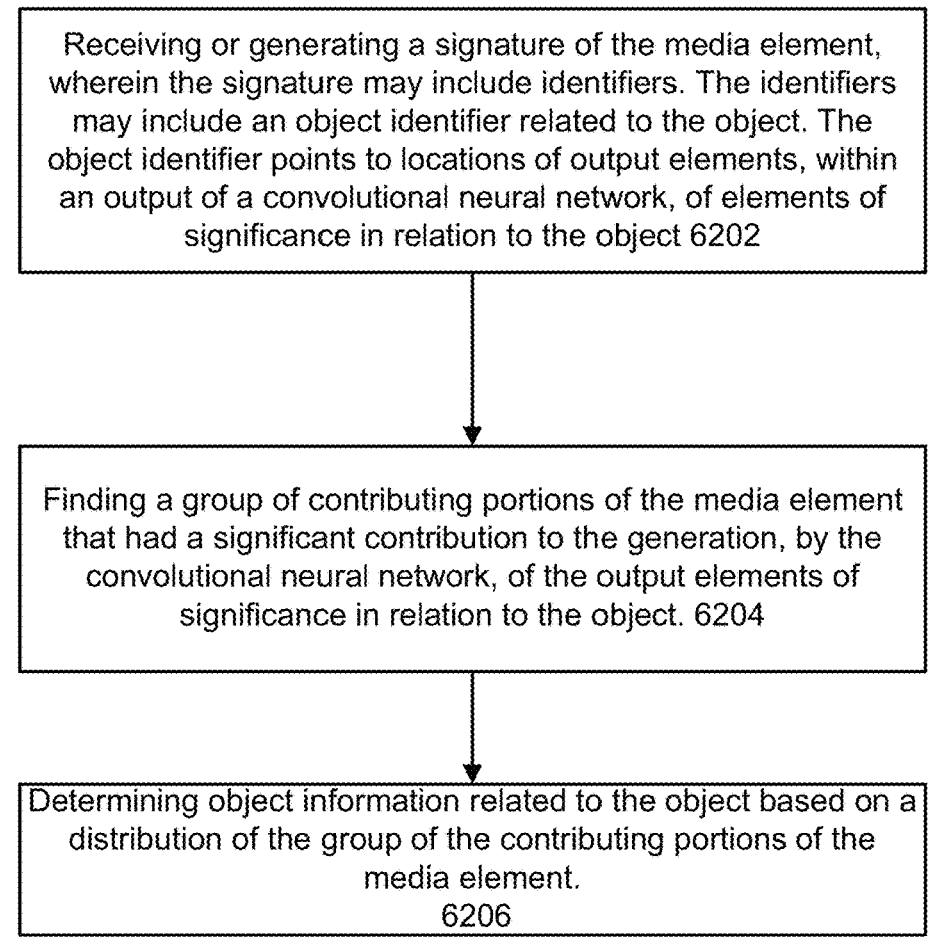
FIG. 7 illustrates an example of an image with two objects of different scale.

FIG. 7 illustrates method 6200 for determining object information related to an object that appears in a media element.

Method 6200 may include steps 6202, 6204 and 6206.

Step 6202 may include receiving or generating a signature of the media element, wherein the signature may include identifiers. The identifiers may include an object identifier related to the object. The object identifier points to locations of output elements, within an output of a convolutional neural network, of elements of significance in relation to the object.

The output of the convolutional neural network may be a tensor that may include a vector of values per each segment of the image; wherein the object appears in a certain segment and wherein the object identifier points to locations of significant values, within a certain vector associated with the certain segment; and wherein the portions of the media element may be image pixels. Step 6204 may applied on selected identifiers—such as identifier that match a signature of a concept data structure.

Step 6204 may include finding a group of contributing portions of the media element that had a significant contribution to the generation, by the convolutional neural network, of the output elements of significance in relation to the object.

Step 6206 may include determining object information related to the object based on a distribution of the group of the contributing portions of the media element.

The signature may include a group of contributing portions of the media element that had a significant contribution to the generation, by the convolutional neural network, of the output elements of significance in relation to the object.

Step 6202 may include generating the signature in an iterative manner, wherein each iteration may include maintaining a mapping between (a) elements of an output of the iteration, and (b) contributing portions of the media element that had a significant contribution to a generation of the elements of the output of the iteration. In this case step 6204 may included in step 6202 or may include retrieving the information generated in step 6204.

Step 6202 may include maintaining mapping related only to output elements of significance of an output of the convolutional neural network.

The object information may be scale information.

The object information may be orientation information.

Step 6204 may include multiple search iterations; wherein each search iteration may be applied on significance contributing output elements of a current layer of the convolutional neural network; wherein each search iteration may include searching, for each one of the significance contributing output elements of the current layer for a group of significant contribution output elements of a previous layer of the convolutional neural network.

Each search iteration may include applying, at each layer of the convolutional neural network, a search function that inverses an operation of the layer of the convolutional neural network.

The operation of the current layer of the convolutional neural network may be a maxpool operation for selecting a local maximum out of a subgrid of output elements of the previous layer; and wherein the search function searches for the output element of the previous layer that had a value of the subgrid.

The operation of the current layer of the convolutional neural network may be applying a convolution kernel on a subgrid of output elements of the previous layer; and wherein the search function searches a product out of a multiplication of each output element of the sub-grid by a weight of the convolution kernel.

Figure 8:
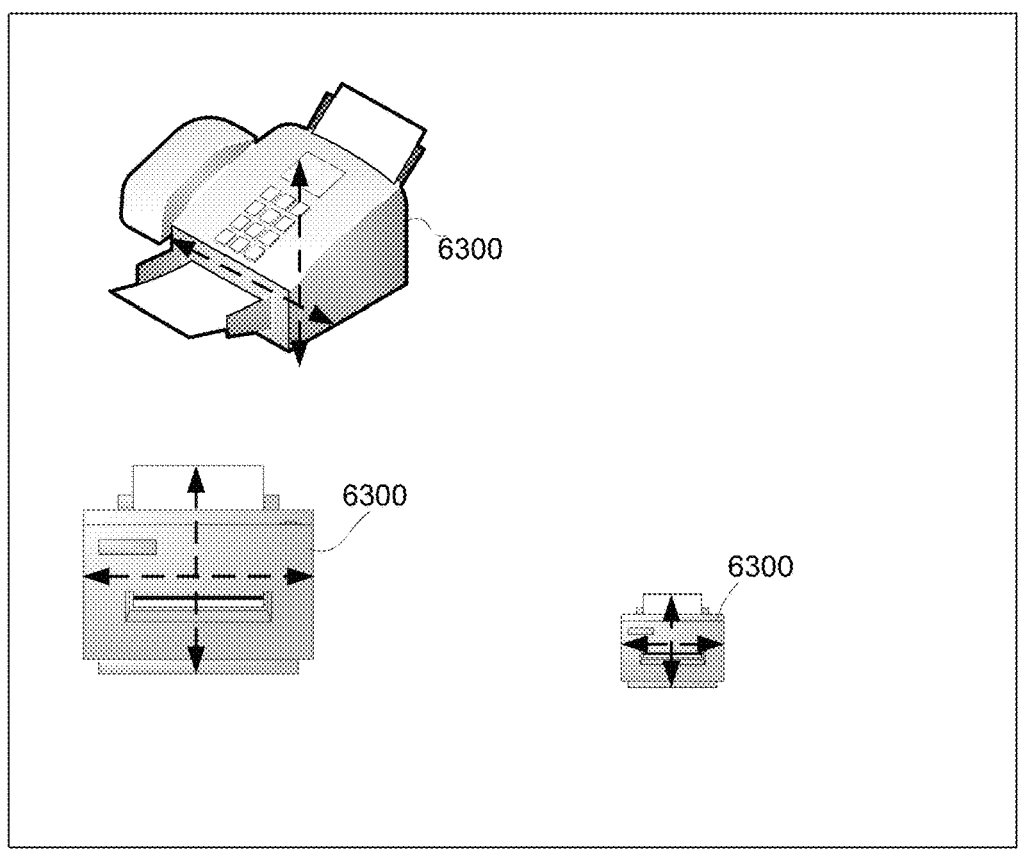
FIG. 8 illustrates an example of an image with objects of different scales and orientations.

FIG. 8 illustrates an example of an image with an object at different scale and orientation.

The object 6300 should be identified by the same identifier—but its distribution differs as a function of scale and orientation.

The distribution of the pixels related to each of the object may represent an approximation of the border of the objects and may provide information about properties such as scale and orientation. The orientation may be determined in various manners—for example find axes that cross the object and may pass through a center of gravity of the object and determine the orientation of the object based on the orientation of the axes. The orientation may be determined during a learning period, based on an equation or a lookup table.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for determining object information related to an object that appears in a media element, the method comprises:
   receiving or generating a signature of the media element, wherein the signature comprises identifiers, wherein the identifiers comprise an object identifier related to the object, wherein the object identifier points to locations of output elements, within an output of a convolutional neural network, of elements of significance in relation to the object;
   finding a group of contributing portions of the media element that had a significant contribution to the generation, by the convolutional neural network, of the output elements of significance in relation to the object; wherein group of contribution portions of the media elements that had the significant contribution comprises a certain number of portions of the media element that had a higher contribution than other portions of the media element;
   wherein the finding of the group of contributing portions of the media element comprises multiple search iterations;
   wherein each search iteration is applied on significance contributing output elements of a current layer of the convolutional neural network;
   wherein each search iteration comprises searching, for each one of the significance contributing output elements of the current layer, for a group of significant contribution output elements of a previous layer of the convolutional neural network;
   and
   determining object information related to the object based on a distribution of the group of the contributing portions of the media element.

2. The method according to claim 1 wherein the signature comprises a group of contributing portions of the media element that had a significant contribution to the generation, by the convolutional neural network, of the output elements of significance in relation to the object.

3. The method according to claim 1 comprising generating the signature in an iterative manner, wherein each iteration comprises maintaining a mapping between (a) elements of an output of the iteration, and (b) contributing portions of the media element that had a significant contribution to a generation of the elements of the output of the iteration.

4. The method according to claim 3 comprising maintaining mapping related only to output elements of significance of an output of the convolutional neural network.

5. The method according to claim 1 wherein the object information is scale information.

6. The method according to claim 1 wherein the object information is orientation information.

7. The method according to claim 1 wherein the certain number is a predefined number or a certain percent of all portions of the media element.

8. The method according to claim 1 wherein each search iteration comprising applying, at each layer of the convolutional neural network, a search function that inverses an operation of the layer of the convolutional neural network.

9. The method according to claim 8 wherein the operation of the current layer of the convolutional neural network is a maxpool operation for selecting a local maximum out of a subgrid of output elements of the previous layer; and wherein the search function searches for the output element of the previous layer that had a value of the subgrid.

10. The method according to claim 8 wherein the operation of the current layer of the convolutional neural network is applying a convolution kernel on a subgrid of output elements of the previous layer; and wherein the search function searches a product out of a multiplication of each output element of the sub-grid by a weight of the convolution kernel.

11. The method according to claim 1 wherein the media unit is an image.

12. The method according to claim 11 wherein the output of the convolutional neural network is a tensor that comprises a vector of values per each segment of the image; wherein the object appears in a certain segment and wherein the object identifier points to locations of significant values, within a certain vector associated with the certain segment; and wherein the portions of the media element are image pixels.

13. A non-transitory computer readable medium for determining object information related to an object that appears in a media element, the non-transitory computer readable medium stores instructions:
receiving or generating a signature of the media element, wherein the signature comprises identifiers, wherein the identifiers comprise an object identifier related to the object, wherein the object identifier points to locations of output elements, within an output of a convolutional neural network, of elements of significance in relation to the object;
finding a group of contributing portions of the media element that had a significant contribution to the generation, by the convolutional neural network, of the output elements of significance in relation to the object;
wherein group of contribution portions of the media elements that had the significant contribution comprises a certain number of portions of the media element that had a higher contribution than other portions of the media element;
wherein the finding of the group of contributing portions of the media element comprises multiple search iterations;
wherein each search iteration is applied on significance contributing output elements of a current layer of the convolutional neural network;
wherein each search iteration comprises searching, for each one of the significance contributing output elements of the current layer, for a group of significant contribution output elements of a previous layer of the convolutional neural network;
and
determining object information related to the object based on a distribution of the group of the contributing portions of the media element.

14. The non-transitory computer readable medium according to claim 13 wherein the signature comprises a group of contributing portions of the media element that had a significant contribution to the generation, by the convolutional neural network, of the output elements of significance in relation to the object.

15. The non-transitory computer readable medium according to claim 13 that stores instructions for generating the signature in an iterative manner, wherein each iteration comprises maintaining a mapping between (a) elements of an output of the iteration, and (b) contributing portions of the media element that had a significant contribution to a generation of the elements of the output of the iteration.

16. The non-transitory computer readable medium according to claim 15 that stores instructions for maintaining mapping related only to output elements of significance of an output of the convolutional neural network.

17. The non-transitory computer readable medium according to claim 13 wherein the object information is scale information.

18. The non-transitory computer readable medium according to claim 13 wherein the object information is orientation information.

19. The non-transitory computer readable medium according to claim 13 wherein the wherein the certain number is a predefined number or a certain percent of all portions of the media element.

20. The non-transitory computer readable medium according to claim 13 wherein each search iteration comprising applying, at each layer of the convolutional neural network, a search function that inverses an operation of the layer of the convolutional neural network.

21. The non-transitory computer readable medium according to claim 20 wherein the operation of the current layer of the convolutional neural network is a maxpool operation for selecting a local maximum out of a subgrid of output elements of the previous layer; and wherein the search function searches for the output element of the previous layer that had a value of the subgrid.

22. The non-transitory computer readable medium according to claim 20 wherein the operation of the current layer of the convolutional neural network is applying a convolution kernel on a subgrid of output elements of the previous layer; and wherein the search function searches a product out of a multiplication of each output element of the sub-grid by a weight of the convolution kernel.

23. The non-transitory computer readable medium according to claim 13 wherein the media unit is an image.

24. The non-transitory computer readable medium according to claim 23 wherein the output of the convolutional neural network is a tensor that comprises a vector of values per each segment of the image; wherein the object appears in a certain segment and wherein the object identifier points to locations of significant values, within a certain vector associated with the certain segment; and wherein the portions of the media element are image pixels.

\* \* \* \* \*